United States Patent [19]

Salamon et al.

[11] 4,075,368
[45] Feb. 21, 1978

[54] BATTERY TERMINAL CONSTRUCTION

[75] Inventors: Klaus Salamon, Kelkheim; Rudolf Eckardt, Steinbach, both of Germany

[73] Assignee: Varta Batterie A. G., Germany

[21] Appl. No.: 690,267

[22] Filed: May 26, 1976

[30] Foreign Application Priority Data

June 25, 1975  Germany ................. 7520197[U]

[51] Int. Cl.² .................................. H01M 2/06
[52] U.S. Cl. .............................. 429/161; 429/184
[58] Field of Search ............. 429/178, 180, 181, 184, 429/161

[56] References Cited

U.S. PATENT DOCUMENTS

| 1,263,500 | 4/1918 | Willard | 429/180 |
| 1,363,648 | 12/1920 | Hubbard | 429/178 |
| 1,484,481 | 2/1924 | Dunbar | 429/178 |
| 1,926,157 | 9/1933 | Lormer et al. | 429/181 |
| 3,918,993 | 11/1975 | Adderley et al. | 429/184 |

FOREIGN PATENT DOCUMENTS 418,768  6/1933  United Kingdom ............ 429/181

Primary Examiner—Donald L. Walton
Attorney, Agent, or Firm—Weiser, Stapler & Spivak

[57] ABSTRACT

A lead storage battery terminal is constructed of copper or aluminum sleeving, which may be clad with lead, and is sealed into the terminal aperture in the battery lid. The bottom of the sleeve is closed and permanently attached to the lead pole bridge.

6 Claims, 1 Drawing Figure

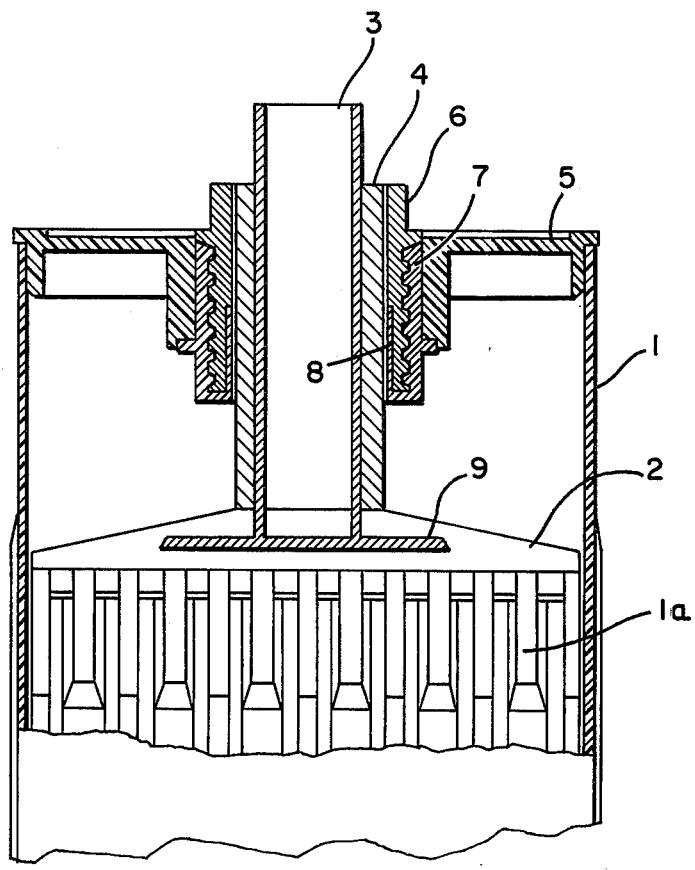

BATTERY TERMINAL CONSTRUCTION

This invention relates to an electrical storage battery and particularly a lead storage battery for vehicle useage.

Electrical lead storage batteries, particularly those used as vehicle batteries, generally include a case of synthetic material and a lid, also of a thermoplastic synthetic which is welded to the case. The battery terminals, which are made of lead, pass through the lid and are connected to the pole bridges within the cell. Terminal passage constructions are known in a wide variety of forms. For example, British Pat. No. 1,372,407, corresponding to German Pat. No. 2,064,547, discloses the provision of vertical and transverse bores in the lead battery terminal. Into these bores, synthetic plastic compound has been injected in such a manner that the lower portion of the terminal, in the region of the gap between the terminal post and the edge of the lid passage, is surrounded by synthetic injection compound.

Another known form of terminal passage construction, disclosed, for example, in German Gebrauchsmuster No. 7,307,438, utilizes a terminal which is coated with a layer of synthetic material applied by molding. This coating of snythetic material is welded to the passage in the lid by means of an annular projection.

In addition to obtaining the most tightly sealed terminal passage construction possible, it is important in storage batteries to be economical of lead, and also to improve the electrical take-off conductivity. To this end, it has already been proposed to provide copper inserts in the portions of the storage battery made of lead in order to obtain higher conductivity. Alternatively, aluminum inserts have been proposed in order to also materially reduce the weight, at the same time that the electrical conductivity is improved.

It is an object of the present invention to also improve the electrical conductivity, particularly in the region of the terminal. It is another object to simultaneously save on lead.

It is a still further object to simultaneously achieve simplification of the assembly and reduction of the height of the storage battery.

These objects and others which will appear are achieved in accordance with the present invention, as follows.

The terminal connection is constituted by one end of a sleeve segment made of a metal havng higher conductivity than lead. One end of this sleeve segment passes in liquid-tight manner through the storage battery lid. The other end is permanently connected, both electrically and mechanically, to the pole bridge which interconnects the electrode plates with one another.

The sleeve segment, which is preferably of tinned copper, or of copper which has been both tinned and provided with a lead coating, is welded to a receptacle which is recessed into the lid in the region of passage through the lid. Alternatively, it may, if desired, be provided with an envelope of synthetic material, which latter is then welded to the lid material in the region of passage through the lid. The bottom of the copper sleeve, i.e. the portion of it which is attached to the pole bridge, is closed and preferably includes ribs which extend into the pole connecting bridge itself.

For further details, reference is made to the discussion which follows in the light of the accompanying drawing, whose single FIGURE shows a cross-sectional elevation of an embodiment of the invention.

This embodiment includes a storage battery container 1 within which a cell block 1a is positioned. The electrodes of one polarity of this cell block are connected to each other by means of pole bridge 2. Sleeve 3, preferably consisting of tinned copper, is cast onto this pole bridge. This casting can be carried out in the same casting process in which the pole bridge is attached to the plate vanes of the electrode plates.

Sleeve 3 is closed at its cast-on end. During the casting process, the previously tinned copper surface can further be provided with a thick lead mantle 4 which may, for example, have a thickness of about 0.5 to about 2mm. This assures corrosion resistance of the sleeve.

In the region of passage through lid 5, a lead receptacle 6 is provided. This lead receptacle 6 has a synthetic plastic coating 7 on its outer surface, at least on that portion of it which passes through the battery lid. On its lower portion its interior surface also has a synthetic plastic coating 8. Particularly suitable as such synthetic plastic are those materials which are commonly used for the lid itself, e.g. polypropylene and polyethylene. This terminal receptacle is welded in completely liquid-tight manner to the lid by means of ultrasonic welding.

Through terminal receptacle 6 there extends the leaded copper sleeve 3. The upper portion of terminal receptacle 6 can be welded to the lead coating of the copper sleeve by known techniques.

The inner plastic coating 8 of the terminal receptacle molds itself under gentle pressure around any unevenness in the lead surface of the copper sleeve coating. In this way additional good sealing takes place in this region.

At the top of the copper sleeve, a cable may then be inserted and this may be firmly connected to the sleeve by means of conventional techniques, such as crimping. In this way, terminal constructions of very low height can be obtained.

It is particularly desirable to replace a portion of the actual pole bridge by a frame member connected to the copper sleeve. To this end, the copper sleeve preferably has appropriate ribs 9 which are also pretinned and which are also cast onto the plate vanes simultaneously with casting of the pole bridge.

In a further embodiment of the invention it is possible to omit the lead receptacle 6 and to attach the synthetic plastic coating directly to the leaded copper or aluminum sleeve. Such a synthetic plastic coating can be produced, for example, by injection molding or spray coating. Here, too, polypropylene or polyethylene are particularly suitable as the synthetic plastic materials. The synthetic plastic so applied to the tubular sleeve in its region of passage can then be directly connected to the storage battery lid by ultrasonic welding. Such a synthetic plastic coating should have a thickness of about 0.5 to about 2mm, and preferably of about 1mm. Moreover, in principle it is also possible to weld a synthetic clad copper cable directly to the pole bridge, in lieu of the tubular sleeve. In that case, the synthetic plastic coating of the cable is welded to the lid in the region of passage therethrough.

The construction of a terminal lead-through in accordance with the invention is particularly economical of lead since a solid terminal is replaced by a hollow copper, or aluminum tube. The higher conductivity of the copper enhances the electrical current output conductivity. Since the mass which must be welded is reduced it is easy to weld the terminal receptacle to the lead-clad copper tube. Moreover, the overall height of the storage battery can also be reduced.

We claim:

1. A terminal construction for a storage battery having a pole bridge connecting electrode plates within the battery and a lid through which the terminal extends, said construction comprising:

a hollow, tubular sleeve of copper or aluminum extending from above the battery lid, through an aperture in said lid all the way down to the pole bridge onto which the end of the sleeve is cast, an annular mantle of lead surrounding and cast into the outside of the sleeve and extending upward from said pole bridge through the lid aperture, means for sealing the portion of the lead mantle which extends through the lid aperture liquid-tight in the lid, an annular lead terminal receptacle, set into and surrounding the mantle to which the mantle is welded in the region of its passage through the lid, the terminal receptacle being coated at least on that portion of its outside where it passes through the lid with a synthetic plastic, and the synthetic plastic coating extending around the bottom of the lead terminal receptacle and upwardly along at least a portion of its inner surface between receptacle and mantle, thereby to accommodate to slight variations in the outside of the lead mantle of the sleeve forming a tight seal around that mantle.

2. The construction of claim 1 wherein the sleeve is of copper.

3. The construction of claim 1 wherein the synthetic plastic coating, at least in its region of passage through the aperture in the battery lid, is ultrasonically welded to the lid.

4. The construction of claim 1 wherein the sleeve end is closed at the point at which it is cast onto the pole bridge.

5. The construction of claim 4 wherein the sleeve is provided at its end cast onto the pole bridge with laterally protruding ribs of the same material as the sleeve extending substantial distances into the pole bridge.

6. The construction of claim 1 wherein the end of the sleeve which extends through the battery lid aperture is adapted to receive a battery connecting cable.

* * * * *